3,134,803
METHOD FOR THE PREPARATION OF
DIACYL CYANIDES
Lawrence F. Arnold, Avon Lake, Ohio, and Wyman Dwight Robb, Calvert City, Ky., assignors, by mesne assignments, to Celanese Corporation of America, New York, N.Y., a corporation of Delaware
No Drawing. Filed Aug. 7, 1961, Ser. No. 129,565
7 Claims. (Cl. 260—465.4)

This invention relates to a novel method for the preparation of diacyl cyanides and particularly diacetyl cyanide (also known as 1-acetoxy-1,1-dicyano ethane), which method involves the vapor phase catalytic reaction of acetic anhydride with hydrogen cyanide.

Diacyl cyanides have become of considerable industrial importance because of the fact that they can be pyrolyzed to give monomeric nitriles, which in turn are of great value in the preparation of synthetic resins particularly useful in making excellent filaments and films. Vinylidene cyanide, prepared by the pyrolysis of 1-acetoxy-1,1-dicyano ethane, is especially useful for this purpose. The pyrolysis of 1-acetoxy-1,1-dicyano ethane to give vinylidene cyanide is described in U.S. Patent 2,476,270. It is important that the 1-acetoxy-1,1-dicyano ethane be extremely pure and free from such impurities as 1-cyanovinyl acetate if it is to be pyrolyzed to vinylidene cyanide.

It is known in the prior art to obtain 1-acetoxy-1,1-dicyano ethane by catalytic reaction of ketene and hydrogen cyanide in both the liquid phase and the vapor phase. It has also been prepared by the catalytic reaction of acetic anhydride and hydrogen cyanide in the liquid phase. Non-catalyzed reaction in the vapor phase of acetic anhydride and hydrogen cyanide has also been performed, but with uniformly low yields of product. Liquid phase reactions present complicated solvent recovery problems as well as problems of recovering pure product free of impurities such as 1-cyanovinyl acetate. In even the best of these prior art processes some catalyst tends to carry over with the reaction mass into the product and appears as a yield lowering impurity or an equipment clogging residue. Acetic anhydride is a lower cost, more readily available raw material than ketene.

Accordingly, it is an object of this invention to prepare pure diacyl cyanides, especially 1-acetoxy-1,1-dicyano ethane, economically and in high yields from easily procurable raw materials by a vapor phase reaction.

Another object is to provide a solid catalyst which will not enter the reaction mass in the vapor phase reaction of acetic anhydride and hydrogen cyanide.

Other objects will be apparent from the description of the invention hereinbelow.

It has now been discovered that the above and other objects are attained by reacting acetic anhydride and hydrogen cyanide, both of which are low cost raw materials, in the vapor phase and in the presence of a solid polymeric amine catalyst. By carrying out the reaction in this manner good yields of high purity diacyl cyanides and esepcially 1-acetoxy-1,1-dicyano ethane are economically obtained.

The vapor phase reaction of a carboxylic acid anhydride with hydrogen cyanide in the presence of a solid polymeric amine catalyst proceeds substantially according to the following equation:

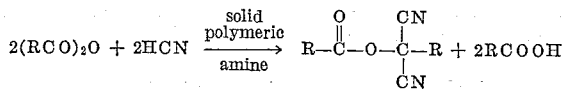

wherein R is an alkyl radical.

The carboxylic acid anhydrides which are reacted with hydrogen cyanide in accordance with the present invention include aliphatic, alicyclic and aromatic monocarboxylic acid anhydrides, such as acetic anhydride, propionic anhydride, butyric anhydride, isobutyric anhydride, n-caprylic anhydride, stearic anhydride, hexahydrobenzoic anhydride, phenylacetic anhydride, benzoic anhydride, toluic anhydride, naphthoic anhydride, and the like. Mixed carboxylic acid anhydrides may also be utilized. The especially preferred anhydrides for use in the present process are those in which the radical R above is an alkyl radical containing from 1 to 6 carbon atoms.

No special reaction procedures are necessary in carrying out the reaction of the present invention. Thus, the reaction may be effected simply by passing vapors of the carboxylic acid anhydride, and hydrogen cyanide over the heated catalyst bed. The catalyst bed may consist entirely of particles of dry, solid polymeric amine, or the catalyst polymer may be dissolved in a solvent such as dimethylformamide or acetonitrile and the solution used to impregnate a bed of activated carbon. It is desirable that the hydrogen cyanide utilized be substantially anhydrous, since any water present may tend to reduce the yield of the desired diacyl cyanide.

The effluent gases which pass from the catalyst chamber include the desired diacyl cyanide, together with some unconverted reactants and by-products. These gases may be utilized in other processes, as such, but are desirably condensed and the diacyl cyanide recovered from the resulting condensate by distillation, preferably at reduced pressures, or by other common means of separation.

The temperature and pressure at which the reaction is conducted may be varied considerably. In general, it may be stated that temperatures in the range of 150° C. to 600° C. are operative, with a particularly preferred range being from 150° C. to 370° C. The reaction is ordinarily carried out at substantially atmospheric pressures, although higher pressures and sub-atmospheric pressures are also operative. Dilution of the reactants with an inert gas such as nitrogen, helium or the like permits the attainment of sub-atmospheric partial pressures, and also facilitates mixing of the reactants and passage of the reactants over the catalyst bed.

The procedure of this invention is to prepare solid polymers and copolymers of certain nitrogen-containing, basic compounds which, in the monomeric form, have been shown to catalyze the reaction of acetic anhydride and hydrogen cyanide to form 1-acetoxy-1,1-dicyano ethane. Being solids, these polymeric catalysts will not enter the reaction mass when gaseous acetic anhydride and hydrogen cyanide are passed over them.

It has been found especially advantageous to form and use polymerized vinyl pyridines. Polyvinyl pyridine is produced by polymerizing monomeric vinyl pyridine in solution in a nitrogen atmosphere using a peroxide catalyst.

Polyvinyl pyridine and copolymers with such ethylenically unsaturated monomers as vinyl acetate, acrylonitrile, styrene, methylmethacrylate and the like may be prepared in solution systems by charging monomers and a free radical catalyst such as benzoyl peroxide to a polymerization bottle or flask containing hexane, heptane, water, or a similar solvent, and equipped for temperature control, agitation and condensation of reaction vapors. Several hours heating and stirring at 50°–70° C. produce a slightly gummy to granular polymer or copolymer that can be filtered, washed and vacuum dried at 40–50° C. The dried product is easily ground to any desired particle size. We have found that catalyst particles that pass through a 100 mesh screen work vey well although both finer and coarser particles can be used.

Another method of preparing polyvinyl pyridines and copolymers thereof is to employ a suspension system wherein monomers, water, sodium alkyl naphthalene sulfonate and benzoyl peroxide are placed in a polymerization container, stirred or shaken till a stable suspension forms, then heated to 50° C. for 10–20 hours under reaction pressure. Uusually the polymer or copolymer comes down in the form of relatively hard beads and is easily separated by filtration for the drying step.

As will be seen from the above reaction equation, 2 moles of the carboxylic acid anhydride are stoichiometrically required to react with 2 moles of hydrogen cyanide to form the diacyl cyanide. However, the two reactants may be brought together in any desired ratio. We prefer to use 2 to 4 moles of anhydride per mole of hydrogen cyanide, to reduce the formation of tarry residues that occurs when hydrogen cyanide reacts in the presence of basic materials.

The reaction was carried out by vaporizing liquid hydrogen cyanide and liquid acetic anhydride and passing the gases into the top of a stainless steel tube reactor, maintained at 175° C., over a suspended catalyst bed. The mixed gases descended to the bottom of the reactor as reaction occurred and were collected and liquefied in a cold receiver. The product layer was distilled to recover 1-acetoxy-1,1-dicyano ethane and unreacted hydrogen cyanide and acetic anhydride which could be recirculated to the reactor.

The following examples are intended to illustrate the preparation of diacyl cyanides according to the method of this invention, but are not to be construed as a limitation upon the scope thereof, for there are, of course, numerous possible variations and modifications. In the examples all parts are by weight.

EXAMPLE I

The monomer 4-vinyl pyridine was homopolymerized and copolymerized with acrylonitrile and with styrene by the solution polymerization technique described above. Water was employed as the solvent and benzoyl peroxide as the catalyst. Monomers, molar ratios and polymerization times are set out below:

*Table 1*

| Monomer | Comonomer | Molar ratio | Time in hours |
|---|---|---|---|
| 4-vinyl pyridine | | 100/0 | 18 |
| Do | acrylonitrile | 70/30 | 12 |
| Do | styrene | 70/30 | 12 |

EXAMPLE II

A 30 inch long stainless steel tube, jacketed for steam heating, 2 inches in diameter, was set up in vertical position as a reaction vessel. A stainless steel mesh basket holding 50 grams of solid catalyst was suspended at the top of the reactor and the bottom of the reactor discharged into a cooled receiver. Reaction temperatures were recorded by a thermocouple installed at the catalyst bed. Acetic anhydride and hydrogen cyanide were vaporized and mixed as they entered the top of the reactor. The flow rates were controlled by rotameters.

Product and unreacted vapors liquefied and collected in the cold receiver. Receiver contents were analyzed for 1-acetoxy-1,1-dicyano ethane and hydrogen cyanide. Typical data obtained were:

*Table 2*

| Catalyst | Reaction Temp., ° C. | Molar Ratio, $Ac_2O:HCN$ | Reaction time, seconds | Conversion of HCN to 1-acetoxy-1, 1-dicyano ethane, percent |
|---|---|---|---|---|
| Poly-4-vinyl pyridine | 175 | 3:1 | 115 | 9.5 |
| 4-vinyl pyridine: styrene | 175 | 3:1 | 107 | 17.5 |
| 4-vinyl pyridine: acrylonitrile | 175 | 3:1 | 109 | 19.0 |

When other solid polymeric amine catalysts including polymers of 2-vinyl pyridine, 2-vinyl pyridine:styrene, 2-vinyl-5-ethyl pyridine:vinyl acetate, 4-vinyl pyridine: alpha-methyl styrene and 4-vinyl pyridine:vinyl toluene were employed in a similar manner, satisfactory conversions of gaseous acetic anhydride and hydrogen cyanide were obtained.

Besides being useful in the preparation of monomeric dinitriles, the diacyl cyanides prepared according to the method of this invention are also useful for many other purposes. For example, they possess insecticidal, fungicidal and herbicidal properties as well as being valuable intermediates in the preparation of other chemical compounds.

Although specific examples of the invention have been herein described, it is not intended to limit the invention solely thereto, but to include all of the variations and modifications falling within the spirit and scope of the appended claims.

We claim:

1. The method which comprises bringing together the anhydride of a monocarboxylic acid selected from the group consisting of aliphatic, alicyclic and aromatic acids, and hydrogen cyanide in the vapor phase at a temperature up to about 600° C. in the presence of a solid polymerized vinyl pyridine catalyst, whereupon chemical reaction occurs between said carboxylic acid anhydride and said hydrogen cyanide, thereby to obtain a diacyl cyanide.

2. The method of claim 1 wherein the catalyst is a polymer of 4-vinyl pyridine.

3. The method of claim 1 wherein the catalyst is a polymer of 4-vinyl pyridine and another ethylenically unsaturated monomer copolymerizable therewith.

4. The method which comprises bringing together a carboxylic acid anhydride of the structure $(RCO)_2O$, wherein R is a lower alkyl radical, and hydrogen cyanide in the vapor phase at a temperature of from about 150° C. to 600° C., in the presence of a solid polymerized vinyl pyridine catalyst, whereupon chemical reaction occurs between said carboxylic acid anhydride and said hydrogen cyanide, thereby to obtain a diacyl cyanide of the structure

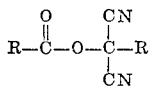

wherein each R has the same significance as above.

5. The method which comprises bringing together acetic anhydride and hydrogen cyanide in the vapor phase at a temperature of from about 150° C. to 600° C., in the presence of a solid polymerized vinyl pyridine catalyst, whereupon chemical reaction occurs between said acetic anhydride and said hydrogen cyanide, thereby to obtain diacetyl cyanide.

6. The method which comprises bringing together acetic anhydride and hydrogen cyanide in the vapor phase at a temperature of from about 150° C. to 370° C., in the presence of a solid polymerized vinyl pyridine catalyst, whereupon chemical reaction occurs between said acetic anhydride and said hydrogen cyanide, thereby to obtain diacetyl cyanide.

7. The method which comprises bringing together acetic anhydride and hydrogen cyanide in the vapor phase at a temperature of from about 150° C. to 370° C., in the presence of a solid polymerized vinl pyridine catalyst, whereupon chemical reaction occurs between said acetic anhydride and said hydrogen cyanide, condensing the reaction products and then distilling the resulting reaction mixture to recover diacetyl cyanide.

References Cited in the file of this patent

UNITED STATES PATENTS 2,596,804 Ardis _____ May 13, 1952